A. PICK.
MAGNETIC CLUTCH.
APPLICATION FILED JULY 24, 1909.
956,164.
Patented Apr. 26, 1910.
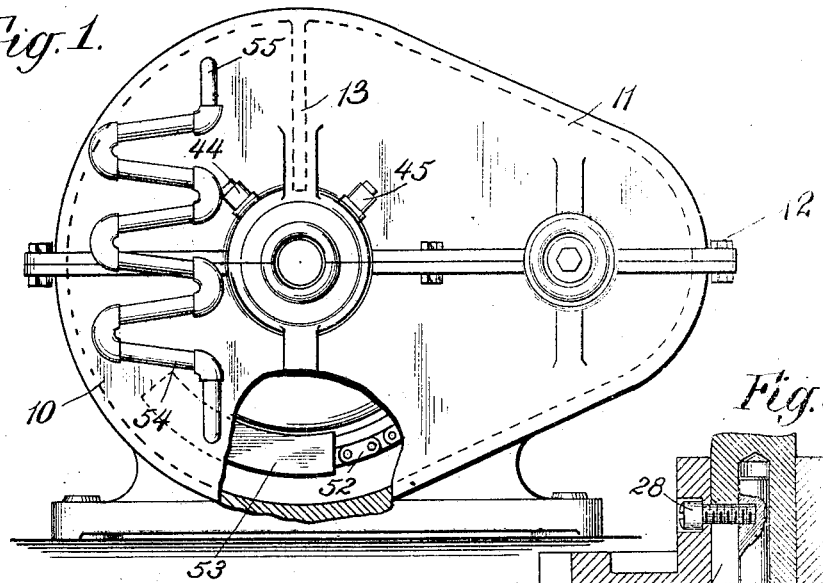
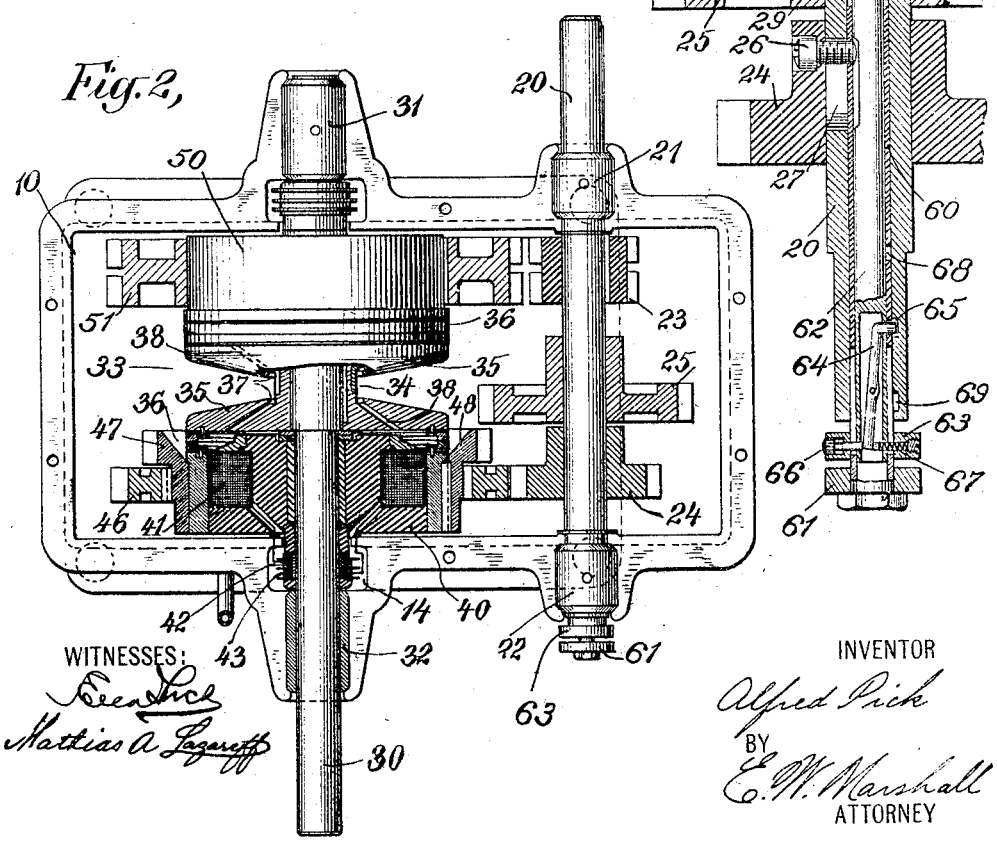
INVENTOR
Alfred Pick
BY
E. W. Marshall
ATTORNEY

UNITED STATES PATENT OFFICE.

ALFRED PICK, OF VIENNA, AUSTRIA-HUNGARY.

MAGNETIC CLUTCH.

956,164.   Specification of Letters Patent.   Patented Apr. 26, 1910.

Application filed July 24, 1909. Serial No. 509,356.

*To all whom it may concern:*

Be it known that I, ALFRED PICK, a subject of the Emperor of Austria-Hungary, and a resident of the city of Vienna, in Austria-Hungary, have invented certain new and useful Improvements in Magnetic Clutches, of which the following is a specification.

My invention relates to electromagnetic clutches, and its object is to improve upon devices of this type and to provide a simple and efficient apparatus which has decided advantages over those now known in the art.

To these ends my invention resides in the construction and arrangements of parts which I will describe in the following specification, and the novel features of which I will set forth in the appended claims.

Referring to the drawings, Figure 1 is a side elevation of a clutch made according to my invention. A part of the casing in this figure is broken away to more clearly show the construction of some of the parts. Fig. 2 is a clutch embodying my invention shown in plan view with the upper part of the casing removed, and with some of its parts drawn in section. In Fig. 3 I have shown, on a larger scale, in sectional plan view the driving shaft with some of its associated parts which may be used for speed adjustments.

Like characters of reference designate corresponding parts in all of the figures.

10 designates the lower portion of a casing which serves to support the mechanism of a clutch and to inclose nearly all of its working parts. The upper portion of the casing is designated by 11. It is arranged to be secured to the lower portion in some suitable manner, as for example, by means of bolts 12.

20 is a driving shaft running in bearings 21, 22, which are supported by the casing, and is arranged to be driven from some external source of power. To this shaft is keyed a sprocket pinion 23. 24 and 25 are gears which also rotate with this shaft, but are arranged to be moved longitudinally thereon in a manner which will be fully described hereinafter.

30 is a driven shaft which is arranged to be rotated in either direction and at different speeds from the shaft 20, or to remain at rest while the latter is rotating. 31 and 32 are bearings for the driven shaft also supported by the casing. Upon this shaft in the central part of the casing is a two-part or twin armature 33. This is splined to the shaft and rotates with it, but is free to have a limited amount of movement in either direction along the shaft. The two parts of this armature are substantially alike and comprise a common hub 34 from which extend disks 35, outside of which are friction rings 36. These rings are preferably made of steel, hardened on their outer or driving surfaces only, so that they will wear well but will not materially increase the residual magnetism of the magnetic circuit. They will also hold their shape and therefore maintain the required form of magnetic circuit and thus prevent the deformation of the clutch surfaces having a detrimental effect upon the magnetic action.

Annular grooves 37 are provided on the inner surfaces of the disks near the hub, and oil holes 38 are drilled through the armature disks from these grooves to the inside of the friction rings. An oil-stop 13 depends from the upper portion of the casing into the space between the two armature disks.

40 designates a magnet member loosely mounted upon the shaft 30 on one side of the armature. Within this magnet member is an energizing coil or winding 41, the terminals of which are connected with a pair of insulated collector rings 42 and 43 which are mounted upon a projecting hub of the magnet member and run in a chamber 14 formed in the casing. This chamber incloses the collector rings and protects them from oil and dust. 44 and 45 are brushes also supported by the casing and bearing upon these rings. By this arrangement an electric current may be sent through this coil at will to magnetize the magnet member and armature. The magnetic circuit of this magnet member and armature is self-demagnetizing so that as soon as current is cut off from the coil the magnetism will disappear. I have disclosed the manner of accomplishing this result in United States Patent No. 854,107, which was issued to me on the 21st day of May, 1907, and I prefer to construct the parts of my present clutch which constitute its magnetic circuit according to the principles set forth in said former patent. On the outer periphery of the magnet member 40 are affixed two gears 46 and 47 which are arranged to mesh with the gears 24 and 25, respectively. The inner portion of the gear 47 is cut away as shown at 48 and partly covers the friction rings 36. 50 is a similar magnet member also rotatably mounted upon the shaft 30. It is provided with a winding and its connections like those above described. On the outer periphery of this magnet member is affixed a sprocket-wheel 51 which is connected with the pinion 23 by a chain 52.

One end of the driving shaft 20 is hollowed out as shown in Fig. 3 to receive a mechanism for shifting the gears 24 and 25. This device comprises a hollow sleeve 60 to which the gear 24 is attached by means of a screw 26.

27 is a slot in the shaft 20 through which the screw projects. This prevents the gear from turning on the shaft but provides for a certain amount of longitudinal movement.

61 is a knob or handle affixed to the end of the sleeve by means of which the gear 24 may be moved longitudinally.

Through the sleeve 60 is a rod 62 to which the gear 25 is affixed by means of a screw 28 which passes through a slot 29 in the shaft. A knob or handle 63 is affixed to this rod and provides means for moving the gear 25. This rod is cut out as shown to hold a pivoted locking member 64, the end of which passes through a hole in the sleeve 60 and into a recess 65 in the shaft. 66 is a button projecting through the knob 63 and through the rod 62 by means of which the locking member may be moved against the action of a compression spring 67 to release the lock.

When the parts are in the positions in which they are shown in Figs. 2 and 3, the gear 24 is in mesh with gear 46 on magnet member 40 so that the magnet member will be driven by the rotation of shaft 20. When it is desired to have this magnet member driven at a higher rate of speed this may be done by depressing the button 66 and pulling the handle 61 and gear 24 forward. Both gears will then be out of mesh and the locking member will enter an opening 68 in the sleeve to hold them both out of engagement. The button may be again depressed and the gear 25 brought forward into engagement with gear 47 by a forward pull upon the handle 63 which will cause the rod 62 to move with it. Now the locking member will pass through the opening 68 into pocket 69 to hold the gears in their new positions. This operation obviously may be reversed.

It may be seen that the magnet member 50 is always connected with the shaft 20 by means of the chain 52 so that it will always rotate with the shaft 20, but in the opposite direction to the rotation of the magnet member 40. But as the magnet members are loosely mounted upon shaft 30 the latter will remain at rest. Now, if a current of electricity is passed through winding 41, the armature 33 will be attracted to the magnet member 40 and will be rotated with it. As it is splined to the shaft 30 the latter will be driven thereby in a direction opposite to the rotation of the shaft 20 as long as the current continues to run through the winding 41. As soon, however, as the current is cut off, the armature will be released, and the magnetic circuit is so constructed as to cause this demagnetization to take place almost instantly. When a current is run through the winding in the other magnet member 50, the latter will become energized and will then cause the armature and the shaft to rotate with it in the same direction as the rotation of shaft 20.

In order to provide the clutch with suitable lubrication and keep its running parts cool I provide an oil-bath in the lower portion of the casing and also use certain other elements which I will proceed to point out.

53 is a trough partially surrounding the gear 51. The rotation of this gear will cause a part of the oil to be carried up into this trough and forced through a pipe 54 outside of the casing, and into the casing again at 55. The pipe is made of sufficient length to cool the oil before it reënters the casing. The upper outlet of the oil is between the two disks of the armature so that it will run down into the annular grooves 37 and out through radial holes 38 to the friction rings 36. The oil-stop 13 keeps the oil from flying over the top of the armature. The shape of the twin armature facilitates this part of the operation and also offers a considerable cooling surface. The under-side 48 of gear 47 also tends to direct such oil as is thrown off centrifugally in a desired direction. Provision may be made for leading a part of the oil from the casing to the shaft bearings in order to lubricate them. In connection with this oiling system attention is called to the fact that the amount of oil circulated will be proportional to the speed of the running parts, so that a great amount of lubrication will be available at such times as it is needed.

The arrangement of parts hereinabove described makes a compact device and saves considerable space. I have shown the speed-changing device with two sets of gears, but obviously, a greater number could be used if a greater number of steps of speed is desired. Many of the features herein described are applicable as well to single clutches as to those of the double type shown in the drawings.

What I claim is:—

1. A magnetic clutch comprising a magnet member, means for energizing said member, an armature, and a friction ring hardened upon its friction surface interposed between said member and the armature.

2. A magnetic clutch comprising a shaft, a magnet member rotatably mounted thereon, means for energizing said member, an armature splined to the shaft, and a friction ring constructed to form an internal air space, said ring being hardened upon its friction surfaces and interposed between the magnet member and the armature.

3. A magnetic clutch comprising a magnet member, means for energizing said member, an armature, a friction ring hardened upon its friction surfaces interposed between said member and the armature, and means for conducting oil through the armature to said friction ring.

4. A magnetic clutch comprising a casing adapted to contain an oil-bath, a shaft, bearings therefor supported by the casing, a magnet member loosely mounted upon the shaft, a winding therefor, and collector rings mechanically connected with the magnet member and electrically connected with its winding; said casing being constructed to form an inclosing chamber between one of the bearings and the oil-bath for said collector rings.

5. A magnetic clutch comprising a casing adapted to contain an oil-bath, a shaft supported by the casing, a magnet member mounted upon the shaft, means for magnetizing said member, an armature splined to the shaft, and a gear directly mounted upon the outer periphery of the magnet member, said gear being arranged to circulate oil within the casing.

6. A magnetic clutch comprising a casing adapted to contain an oil-bath, cooling means for the oil, a shaft supported by the casing, a magnet member loosely mounted upon the shaft, means for magnetizing said member, an armature splined to the shaft, and a gear directly mounted upon the outer periphery of the magnet member, said gear being arranged to force oil through said cooling means.

7. A magnetic clutch comprising an inclosing casing adapted to contain an oil-bath, a cooling pipe outside of the casing and connected with the lower and upper portions thereof, an oil-stop depending from the upper portion of the casing, a shaft supported by the casing, a magnet member loosely mounted upon the shaft, means for magnetizing said member, an armature splined to the shaft, and a gear directly mounted upon the outer periphery of the magnet, said gear being arranged to circulate oil within the casing and to force oil through said cooling pipe.

8. A magnetic clutch comprising an inclosing casing, a shaft supported by the casing, a magnet member loosely mounted upon the shaft, a coil within said magnet member, an armature splined to the shaft, and collector rings insulated from but supported by said magnet member and connected with the magnet member winding, said casing being constructed to form a chamber for inclosing the collector rings.

9. A magnetic clutch comprising an inclosing casing adapted to contain an oil-bath, a shaft, bearings therefor, supported by the casing, a magnet member loosely mounted upon said shaft, an energizing coil within the magnet member, and collector rings insulated from but supported by said magnet member and connected with the magnet member winding; said casing being constructed to form an inclosing chamber between one of the bearings and the oil-bath for said collector-rings.

10. A magnetic clutch comprising a shaft, a magnet member rotatably mounted thereon, means for energizing said member, an armature splined to the shaft, gears connected with the magnet member, a second shaft, gears mounted upon the second shaft, and means for independently moving the gears on the second shaft into or out of mesh with the gears on the magnet member shaft.

11. A magnetic clutch comprising a shaft, a magnet member rotatably mounted thereon, means for energizing said member, an armature splined to the shaft, gears connected with the magnet member, a second shaft, gears mounted upon the second shaft, means for independently moving the gears on the second shaft into or out of mesh with the gears on the magnet member shaft, and means for locking said movable gears in different operative positions.

12. A magnetic clutch comprising a shaft, a magnet member rotatably mounted thereon, means for energizing said member, an armature splined to the shaft, gears connected with the magnet member, a second shaft, gears mounted upon the second shaft, means for independently moving the gears on the second shaft into or out of mesh with the gears on the magnet member shaft, means for locking said movable gears in different operative positions, and a casing arranged to support said shafts and to inclose the clutch.

13. A magnetic clutch comprising a pair of magnet members, means for rotating said members in opposite directions, means for energizing either of the magnet members, an armature between said magnet members, and friction rings hardened upon their friction surfaces interposed between said armature and the magnet members.

14. A magnetic clutch comprising a shaft, a pair of magnet members rotatably mounted upon the shaft, means for energizing either of the magnet members, a double armature splined to the shaft between the magnet members, and means for rotating said magnet members in opposite directions, said means comprising gears directly mounted upon the outer periphery of the members.

15. A magnetic clutch comprising a casing adapted to contain an oil-bath, rotatable members within said casing, a stationary oil-pipe from the lower to the upper portion of the casing, and means for causing the rotation of said members to circulate oil through said pipe.

16. A magnetic clutch comprising a shaft, a pair of magnet members rotatably mounted thereon, means for energizing either of said magnet members, a double armature splined to said shaft between the magnet members, friction rings constructed to form internal air spaces, said rings being hardened on their friction surfaces and interposed between the magnet members and the armature, and means for leading oil from the armature to the friction rings.

17. A magnetic clutch comprising a shaft, a pair of magnet members mounted thereon and arranged to be rotated in opposite directions, means for energizing either of said magnet members, a double armature splined to said shaft between the magnet members, friction rings of hardened steel on their friction surfaces and interposed between said magnet members and armature, a second shaft, a sprocket-pinion thereon, a chain connecting said pinion with one of the magnet members, and a gear upon said second shaft connected with the other magnet member.

18. A magnetic clutch comprising a shaft, a pair of magnet members mounted thereon and arranged to be rotated in opposite directions, means for energizing either of said magnet members, a double armature splined to said shaft between the magnet members, friction rings of steel constructed to form internal air spaces, said rings being hardened on their friction surfaces and attached to the magnet members and the armature, gears directly mounted upon the outer peripheries of the magnet members, a second shaft, a sprocket-pinion thereon, a chain connecting said pinion with the gear on one of the magnet members, and a gear upon said second shaft in mesh with the gear on the other magnet member.

19. A magnetic clutch comprising a shaft, a pair of magnet members rotatably mounted thereon, means for energizing either of said magnet members, a double armature splined to said shaft between the magnet members, gears directly mounted upon the outer peripheries of the magnet members, a second shaft, a sprocket-pinion thereon, and a chain connecting said pinion with the gear on one of the magnet members; a plurality of gears upon said second shaft, means for independently moving said gears into or out of mesh with the gears on the other magnet member, and means for locking said movable gears in different operative positions.

20. A magnetic clutch comprising a casing adapted to contain an oil bath, a shaft supported by the casing, a pair of magnet members rotatably mounted upon said shaft, means for energizing either of said magnet members, a double armature splined to the shaft between the magnet members, gears directly mounted upon the outer peripheries of the magnet members, a second shaft also supported by the casing, a sprocket-pinion thereon, and a chain connecting said pinion with the gear on one of the magnet members; a trough about said chain, a pipe connected with the trough and to the upper portion of the casing, and another gear upon said second shaft in mesh with the gear on the other magnet member.

21. A magnetic clutch comprising a casing adapted to contain an oil-bath, a shaft supported by the casing, a pair of magnet members rotatably mounted upon said shaft, means for energizing either of said magnet members, a two-part armature splined to said shaft between the magnet members, friction rings attached to the magnet members and the armatures, gears directly mounted upon the outer peripheries of the magnet members, a second shaft also supported by the casing, a sprocket-pinion thereon, and a chain connecting said pinion with the gear on one of the magnet members; a plurality of gears upon said second shaft, means for independently moving said gears into or out of mesh with the gears on the other magnet member, and means for locking said movable gears in different operative positions; an oil-cooling device, a trough about said chain, said chain and trough being arranged to force oil through the cooling device into the upper portion of the casing, and an oil-stop between the two parts of the armature depending from the inside of the casing.

22. A magnetic clutch comprising a shaft, a magnet member rotatably mounted thereon, means for energizing said member, an armature splined to the shaft, and friction rings of steel hardened upon their friction surfaces and attached to said magnet member and armature at the outer edges thereof.

23. A magnetic clutch comprising a magnet member, means for energizing said member, an armature, friction rings hardened upon their friction surfaces attached to said member and the armature at the outer edge thereof, and means for conducting oil through the armature to said friction ring.

24. A magnetic clutch comprising a shaft, a pair of magnet members rotatably mounted thereon, means for energizing either of said magnet members, a double armature splined to said shaft between the magnet members, friction rings of steel constructed to form internal air spaces, said rings being hardened on their friction surfaces and attached to the magnet members and the armature, and means for leading oil from the armature to the friction rings through said air spaces.

In testimony whereof I have signed my name to this specification in the presence of two subscribing witnesses.

ALFRED PICK.

Witnesses:
ROBERT W. HEINGARTNER,
AUGUST FUGGER.